(12) United States Patent
Hamada

(10) Patent No.: US 12,012,148 B2
(45) Date of Patent: Jun. 18, 2024

(54) VEHICLE SKELETON MEMBER

(71) Applicant: NIPPON STEEL CORPORATION, Tokyo (JP)

(72) Inventor: Koichi Hamada, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 399 days.

(21) Appl. No.: 17/435,335

(22) PCT Filed: Mar. 6, 2020

(86) PCT No.: PCT/JP2020/009744
§ 371 (c)(1),
(2) Date: Aug. 31, 2021

(87) PCT Pub. No.: WO2020/179916
PCT Pub. Date: Sep. 10, 2020

(65) Prior Publication Data
US 2022/0135134 A1 May 5, 2022

(30) Foreign Application Priority Data
Mar. 6, 2019 (JP) .................................. 2019-040176

(51) Int. Cl.
*B62D 21/15* (2006.01)
*B60R 19/18* (2006.01)
(Continued)

(52) U.S. Cl.
CPC .............. *B62D 21/15* (2013.01); *B60R 19/18* (2013.01); *B62D 21/00* (2013.01); *B62D 21/02* (2013.01);
(Continued)

(58) Field of Classification Search
CPC ........ B62D 21/15; B62D 21/00; B62D 25/00; B62D 27/02; B62D 25/025; B62D 21/02;
(Continued)

(56) References Cited

U.S. PATENT DOCUMENTS 9,457,844 B2 * 10/2016 Yoshida .................. B62D 25/04
2015/0360725 A1 * 12/2015 Yoshida ............... B62D 21/157
296/187.12
(Continued)

FOREIGN PATENT DOCUMENTS

CN 105313990 A 2/2016
JP 2011-37291 A 2/2011
(Continued)

*Primary Examiner* — Amy R Weisberg
*Assistant Examiner* — Dana D Ivey
(74) *Attorney, Agent, or Firm* — Birch, Stewart, Kolasch & Birch, LLP

(57) ABSTRACT

A vehicle skeleton member 10 includes: a hat-shaped member 1; a closing plate 2; a reinforcement member 6; and a plurality of welds 31. The hat-shaped member 1 includes a first top plate 1a, two first walls 1b, and two flanges 1c. The reinforcement member 6 includes a second top plate 6a and two second walls 6b. The welds 31 join the first and second walls 1b and 6b. The welds 31 joining the first and second walls 1b and 6b are located at positions on the first walls 1b closer to the closing plate 2 than the middle surface C1 between the first top plate 1a and closing plate 2 is. Edge segments 4 of the reinforcement member 6 are located between the welds 31.

8 Claims, 7 Drawing Sheets

(51) Int. Cl.
  *B62D 21/00* (2006.01)
  *B62D 21/02* (2006.01)
  *B62D 25/00* (2006.01)
  *B62D 25/02* (2006.01)
  *B62D 25/04* (2006.01)
  *B62D 25/20* (2006.01)
  *B62D 27/02* (2006.01)
  *F16B 5/08* (2006.01)

(52) U.S. Cl.
  CPC ............ *B62D 25/00* (2013.01); *B62D 25/025* (2013.01); *B62D 25/04* (2013.01); *B62D 25/20* (2013.01); *B62D 27/02* (2013.01); *F16B 5/08* (2013.01)

(58) Field of Classification Search
  CPC ........... B62D 25/20; B62D 25/04; F16B 5/08; B60R 19/18
  USPC .... 296/193.06, 203.02, 203.04, 209, 193.07, 296/204, 203.01; 280/784; 293/102
  See application file for complete search history.

(56) References Cited

U.S. PATENT DOCUMENTS

2016/0023684 A1   1/2016   Lange
2020/0353990 A1   11/2020  Kosaka et al.

FOREIGN PATENT DOCUMENTS

| | | |
|---|---|---|
| JP | 2014-73769 A | 4/2014 |
| JP | 2014-223669 A | 12/2014 |
| JP | 2017-171133 A | 9/2017 |
| WO | WO 2019/102644 A1 | 5/2019 |

* cited by examiner

VEHICLE SKELETON MEMBER

TECHNICAL FIELD

The present invention relates to a vehicle skeleton member including a reinforcement member.

BACKGROUND ART

Vehicle skeleton members such as B-pillars or side sills, for example, are required to have impact resistance. For example, JP 2011-37291 A (Patent Document 1) discloses a front pillar structure. In this front pillar structure, the front pillar's outer portion, which has a hat-shaped cross section, and a pillar reinforcement lower are joined together to form a front pillar lower having an open cross-sectional structure that is open toward the interior as determined along the vehicle-width direction. The front wall of the pillar reinforcement lower and the flanges are thick plates with higher strengths than the other portions.

JP 2014-73769 A (Patent Document 2) discloses a vehicle-body structure. In this vehicle-body structure, edges of the center pillar inner panel, edges of the center pillar outer reinforcement and edges of the side outer panel are placed over one another and then joined together by spot welding. The center pillar outer reinforcement is formed from high-strength steel sheet. Edges of the center pillar outer reinforcement are provided with wavy portions, each located between a pair of spot welds and wavy along the longitudinal direction of the edges. The wavy portions are capable of being extended in the longitudinal direction of the edges when the edges are deformed in the direction of tension along the longitudinal direction of the edges.

PRIOR ART DOCUMENTS

Patent Documents

[Patent Document 1] JP 2011-37291 A
[Patent Document 2] JP 2014-73769 A

SUMMARY OF THE INVENTION

Problems to Be Solved By the Invention

The present inventors considered arrangements in which vehicle skeleton member including a hat-shaped member and a closing plate are reinforced by a groove-shaped reinforcement member. A reinforcement member is preferably light-weight. The inventors found that, if a reinforcement member is formed from a high-strength material for the purpose of efficient reinforcement, the joints between the reinforcement member and hat-shaped member can often present initiation points of fracture.

The present disclosure discloses a vehicle skeleton member capable of providing efficient reinforcement in an arrangement with a high-strength reinforcement member added thereto.

Means for Solving the Problems

A vehicle skeleton member according to an embodiment of the present invention includes: a hat-shaped member; a closing plate; a reinforcement member; and a plurality of welds. The hat-shaped member includes a first top plate, two first walls; and two flanges. The first top plate is located between the two first walls. Each of the first walls is located between the top plate and the associated one of the flanges. The flanges are joined to the closing plate. The reinforcement member includes a second top plate and two second walls. The second top plate is located between the two second walls. Each of the first walls and the associated one of the second walls are overlaid on each other. The plurality of welds join the first walls and the second walls. The plurality of welds joining the first and second walls are located at positions on the first walls closer to the closing plate than a middle surface between the first top plate and the closing plate is. A tensile strength of the second walls is higher than a tensile strength of the first walls. In each of the second walls, an edge opposite to an edge adjacent to the second top plate provides an edge segment of the reinforcement member. The edge segment of the reinforcement member is located between the plurality of welds.

Effects of the Invention

The present disclosure provides a vehicle skeleton member capable of providing efficient reinforcement in an arrangement with a high-strength reinforcement member added thereto.

EMBODIMENTS FOR CARRYING OUT THE INVENTION

Figure 1A:
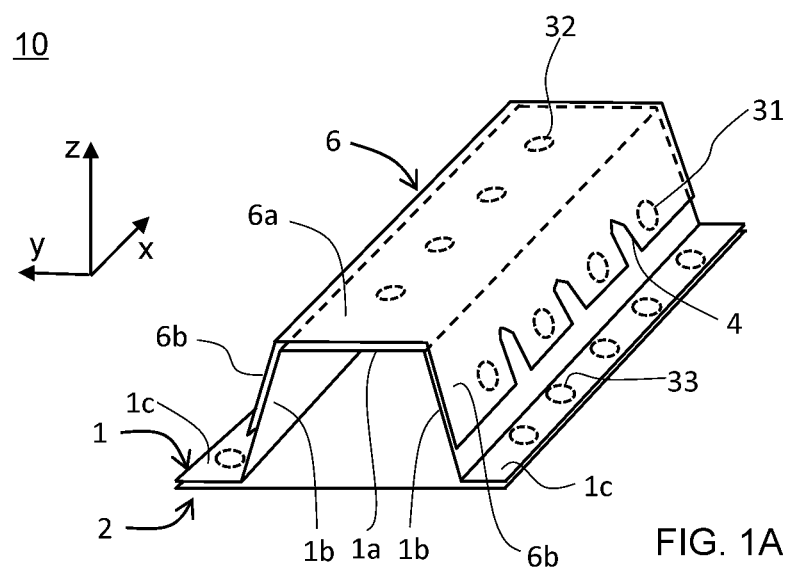
FIG. 1A is a perspective view of a structural member according to an embodiment.

The inventors considered constructions of vehicle skeleton members with a hat-shaped member and a closing plate joined together to form a closed cross-sectional structure, where a groove-shaped reinforcement member is added to reinforce the structure. A reinforcement member is preferably light-weight. The inventors investigated reinforcement members made of a high-strength material with a higher strength than the hat-shaped member. Further, they attempted to find an efficient positioning of a reinforcement member of a high-strength material. They arrived at an arrangement where the walls of a hat-shaped member and a reinforcement member are joined together at positions closer to the closing plate than the middle surface between the joints between the hat-shaped member and closing plate, on one hand, and the top plate of the hat-shaped member, on the other hand. Such an arrangement can potentially provide efficient reinforcement. To allow a vehicle skeleton member to absorb energy efficiently during bending-crushing deformation, it is important to allow the walls of the hat-shaped member to plastically deform and thus work. If the reinforcement member is positioned closer to the closing plate than the middle in the height of the walls of the hat-shaped member and thus joined to the walls, this can promote plastic deformation of the walls so they can efficiently absorb energy. In such an arrangement, energy absorption can be more efficient if the strength of the reinforcement member is higher than the strength of the walls of the hat-shaped member.

However, they discovered that, in such an arrangement, upon application of an impact to the top plate of the hat-shaped member, a fracture can easily occur from initiation points represented by welds joining the hat-shaped member and reinforcement member. If the joining of a high-strength reinforcement member and hat-shaped member is done by welding, portions of the reinforcement member surrounding the welds can soften. Such a softened portion will be referred to as HAZ-softened portion.

If a hat-shaped member with such a reinforcement member of a high-strength material added thereto is used as a vehicle-body skeleton member of an automobile, an impact to the automobile can cause strain to be concentrated in the HAZ-softened portions around welds of the reinforcement member and hat-shaped member, causing a fracture from initiation points represented by these HAZ-softened portions. More specifically, if the reinforcement member has a higher strength than the hat-shaped member, HAZ softening can easily occur in the reinforcement member.

The inventors investigated the mechanism with which a fracture occurs from initiation points represented by joints between the reinforcement member and hat-shaped member. They found that, if the welds joining the reinforcement member and hat-shaped member are located closer to the tension side than the neutral plane is, tension forces in the longitudinal direction of the hat-shaped member are applied to the welds such that a fracture can easily occur from initiation points represented by HAZ-softened portions. That is, if the welds are located closer to the closing plate than the middle in the height of the walls of the hat-shaped member to improve energy absorption efficiency during bending deformation, tension forces in the longitudinal direction of the hat-shaped member can easily occur in the welds. This can cause strain concentration in the HAZ-softened portions due to tension forces such that a fracture can easily occur from initiation points represented by HAZ-softened portions.

Based on this finding, the inventors arrived at an arrangement with a plurality of welds joining a hat-shaped member and a reinforcement member at locations closer to the closing plate than the middle in the height of the walls of the hat-shaped member is, where notches or holes in the reinforcement member are provided between the welds. That is, they arrived at an arrangement where edge segments of the reinforcement member are located between the welds. Thus, even if tension forces in the longitudinal direction of the hat-shaped member are applied to a region between a pair of adjacent welds, the edge segment of the reinforcement member located between the adjacent welds mitigates the tension forces. This arrangement can reduce strain concentration in HAZ-softened portions upon application of tension forces between a plurality of welds. This will make it possible to prevent a fracture originating from initiation points represented by HAZ-softened portions. As a result, the reinforcement effect of the reinforcement member can be produced more efficiently.

Arrangement 1

A vehicle skeleton member according to an embodiment of the present invention includes: a hat-shaped member; a closing plate; a reinforcement member; and a plurality of welds. The hat-shaped member includes a first top plate, two first walls, and two flanges. The first top plate is located between the two first walls. Each of the first walls is located between the top plate and the associated one of the flanges. The flanges are joined to the closing plate. The reinforcement member includes a second top plate and two second walls. The second top plate is located between the two second walls. Each of the first walls and the associated one of the second walls are overlaid on each other. The plurality of welds join the first walls and the second walls. The plurality of welds joining the first walls and the second walls are located at positions on the first walls closer to the closing plate than a middle surface between the first top plate and the closing plate is. A tensile strength of the second walls is higher than a tensile strength of the first walls. In each of the second walls, an edge opposite to an edge adjacent to the second top plate provides an edge segment of the reinforcement member. The edge segment of the reinforcement member is located between the plurality of welds.

In the above arrangement, the welds joining the hat-shaped member and reinforcement member are located closer to the closing plate than the middle surface between the first top plate of the hat-shaped member and the closing plate is. The second walls, belonging to the reinforcement member, have a higher strength than the first walls which belong to the hat-shaped member. Thus, when the first top plate receives a vertical force from outside the first top plate and the vehicle skeleton member deforms, the reinforcement member deforms together with the hat-shaped member. The reinforcement member increases the resistance to this deformation. Thus, the hat-shaped member and reinforcement member resist the load while promoting plastic deformation of the walls. Thus, the vehicle skeleton member can efficiently absorb energy during bending-crushing deformation.

Further, when the first top plate receives a vertical force and the vehicle skeleton member deforms, tension forces in the longitudinal direction of the hat-shaped member occur between the welds. As the strength of the reinforcement member is higher than that of the hat-shaped member, HAZ-softened portions are easily formed around the welds. As strain due to the tension forces is concentrated in the HAZ-softened portions, a fracture occurs from initiation points represented by HAZ-softened portions. However, in the above-described arrangement, edge segments of the reinforcement member are located between the welds. That is, portions of the reinforcement member between the welds are disconnected. The edge segments of the reinforcement member may be, for example, cuts or hole edges in the reinforcement member. This will mitigate tension forces acting on the portions between the welds. Thus, a fracture from initiation points represented by welds are less likely during deformation of the vehicle skeleton member. Further, the edge segments of the reinforcement member between the welds are parts of those edges of the second walls which are opposite to the edges adjacent to the second top plate. Thus, each of the second walls extend from the second top plate to a region between the welds. Thus, the regions covered with the reinforcement member are smaller than in arrangements where the second walls extend from the second top plate down to the flanges. That is, efficient energy absorption is achieved by a reinforcement member with less material. As a result, the reinforcement effect of the reinforcement member can be produced more efficiently.

In Arrangement 1 above, the first top plate and the second top plate may overlie each other. This will further increase the reinforcement effect of the reinforcement member. In such implementations, welds joining the first and second top plates may be provided. This will further increase the reinforcement effect of the reinforcement member. When the two members overlie each other, the two members are in contact at least partially.

Arrangement 2

Starting from Arrangement 1 above, it is preferable that the edge segment of the reinforcement member extends across a region between adjacent ones of the welds. This will further increase the effect of mitigating tension forces acting on heat-affected zones (i.e., HAZ-softened portions). "Adjacent ones of the welds" means at least a pair of adjacent ones of the plurality of welds. In arrangements where the edge segment of the reinforcement member does not extend across the region between a pair of adjacent welds, the position on the edge segment of the reinforcement member closest to the first top plate is located in the region between the adjacent welds. If the edge segment of the reinforcement member extends across the region between the adjacent welds, the effect of mitigating tension forces in the longitudinal direction of the hat-shaped member between the adjacent welds will be significantly improved over an arrangement where the edge segment of the reinforcement member does not extend across that region.

The second top plate may be located at a position on the first wall closer to the first top plate than the middle surface between the first top plate and the closing plate is. Thus, each second wall extends from a position closer to the first top plate than the middle surface is to a position closer to the closing plate than the middle surface is. This will improve the reinforcement member's effect of reinforcing the first walls. As a result, the vehicle skeleton member can efficiently absorb energy during bending-crushing deformation.

Arrangement 3

Starting from Arrangement 2 above, it is preferable that the edge segment of the reinforcement member extends across the region between the adjacent ones of the welds and extends up to a position on the associated first wall closer to the first top plate than the middle surface between the first top plate and the closing plate is. That is, the edge segment of the reinforcement member may extend from the region between the welds up to a region closer to the first top plate than the middle surface is. When the structural member receives a force perpendicular to the first top plate from outside the first top plate and deforms, the tension forces in the longitudinal direction of the hat-shaped member are small at the middle surface for the first walls, which is located close to the neutral axis. The tension forces are larger as it goes away from the middle surface toward the closing plate. Since the edge segment of the reinforcement member extends past the middle surface toward the first top plate, the edge segment of the reinforcement member is positioned so as to cover the entire region where tension forces can occur during deformation. This will further increase the arrangement's effect of mitigating tension forces acting on regions between the welds.

The edge segment of the reinforcement member located between the adjacent ones of the welds may extend to a position on the associated first wall closer to the first top plate than the middle surface between the first top plate and the closing plate but not reach the second top plate. That is, the edge segment of the reinforcement member between the adjacent welds may be constructed not to reach the ridge between the second top plate and the second wall. In yet other words, the edge segment of the reinforcement member may be constructed to be located both in the region between the adjacent ones of the welds and in a region between the middle surface and the second top plate. This will increase the arrangement's effect of mitigating tension forces between welds while ensuring the reinforcement effect of the ridges between the second top plate and second walls of the reinforcement member.

In this arrangement, it is preferable that a distance between a position on the edge segment of the reinforcement member that is closest to the second top plate and the middle surface, HT, is not larger than $(\frac{2}{3})h$ (i.e. $HT \leq (\frac{2}{3})h$). Here, h is the distance h between the second top plate and the middle surface. This will increase the arrangement's effect of mitigating tension forces between the welds while further ensuring the reinforcement effect of the ridges between the second top plate and second walls of the reinforcement member. If the ridge between the second top plate and each second wall has a round-shaped portion, the distance between the end of the round-shaped portion adjacent to the second wall, on one hand, and the middle surface, on the other, is treated as the distance h.

The line of intersection between the middle surface between the first top plate and the closing plate, on one hand, and the outer surface of a first wall, on the other, is treated as the middle line. As observed in a cross section perpendicular to the longitudinal direction of the hat-shaped member, the middle line on the first wall is located, at the middle (i.e., ½) in height between the end of the first wall adjacent to the top plate and the end adjacent to the flange, as measured in the direction perpendicular to the flange surfaces. A position on a first wall closer to the closing plate than the middle surface is is a position on the first wall closer to the closing plate than the middle line is. A position on a first wall closer to the first top plate than the middle surface is is a position on the first wall closer to the first top plate than the middle line is. If the cross-sectional shape of the ridge between the first top plate and a first wall has a round-shaped portion, the end of the first wall adjacent to the first top plate used to determine the middle line is the end of the round-shaped portion of the ridge adjacent to the first top plate. If the cross-sectional shape of the ridge between the first wall and flange has a round-shaped portion, the end of the first wall adjacent to the flange is the end of the round-shaped portion adjacent to the flange.

The hat-shaped member and reinforcement member may be curved along the longitudinal direction. In such implementations, at least one of the ridge between the first top plate and a first wall of the hat-shaped member and the ridge between the first wall and the associated flange extends in a curved manner. The ridge between the first top plate and a first wall of the hat-shaped member and the ridge between the first wall and the associated flange may be parallel, or may not be parallel.

The first top plate and first walls of the hat-shaped member may be formed from a flat sheet, or from a flat sheet having irregularities in some portions. The second top plate and second walls of the reinforcement member may be formed from a flat sheet, or from a flat sheet having irregularities in some portions. The first top plate and flanges of the hat-shaped member may be parallel, or may not be parallel.

Arrangement 4

Starting from any one of Arrangements 1 to 3, the first walls may be formed such that edges of the first walls are not present between adjacent ones of the welds. The edge segment of the reinforcement member located between the adjacent welds may overlie the associated first wall. In such implementations, each first wall of the hat-shaped member is continuous without an interruption across the entire region between the adjacent welds. This will appropriately strengthen the ability of the first walls of the hat-shaped member, which have a lower strength than the reinforcement member, to resist deformation due to tension forces between the welds. The structural member as a whole can deform with higher resistance to bending deformation while the second walls of the reinforcement member mitigate tension forces between the welds. More efficient energy absorption is possible as the first walls of the hat-shaped member and the second walls of the reinforcement member deform while working together for resistance.

Arrangement 5

Starting from any one of Arrangements 1 to 4, it is preferable that the edge segment of the reinforcement member extending between the plurality of welds do not reach a ridge between the second top plate and the associated second wall. As the edge segment of the reinforcement member does not disrupt the ridge, the strength of the reinforcement member is higher than in arrangements where the edge segment of the reinforcement member reaches the ridge. If the ridge between the second top plate and each of the second walls has a round-shaped portion, that is, if the outer surface of the corner between the second top plate and the second wall is a curved surface, the end of the round-shaped portion adjacent to the second wall is treated as the position of the ridge.

Arrangement 6

Starting from any one of Arrangements 1 to 5 above, the tensile strength of the second walls may be not lower than 1100 MPa. Furthermore, to further improve the arrangement's reinforcement effect, it is preferable that the tensile strength of the second walls is not lower than 1180 MPa.

Arrangement 7

Starting from any one of Arrangements 1 to 6, it is preferable that the tensile strength of the first walls is not higher than 980 MPa. This will prevent a fracture from initiation points represented by HAZ-softened portions around welds on the first walls of the hat-shaped member. For the same purpose, the tensile strength of the first walls of the hat-shaped member may be lower than 1100 MPa. If deformation resistance is to be increased, the higher the strength of the first walls, the better. For example, the tensile strength of the first walls may be not lower than 1100 MPa. No upper limit is contemplated for the tensile strength of the first walls, but the tensile strength of the first walls may be lower than 1180 MPa, for example.

Arrangement 8

A vehicle skeleton including the vehicle skeleton member according to any one of Arrangements 1 to 7 above is also one embodiment of the present invention. In the vehicle skeleton, the first top plate may be located outward with respect to a vehicle, and the closing plate may be located inward with respect to the vehicle. This will enable forming a vehicle skeleton that is impact resistant to an impact from outside the vehicle.

The reinforcement member may be located outside the closed cross-sectional construction formed by a hat-shaped member and a closing plate. Alternatively, the reinforcement member may be located inside the closed cross-sectional construction, i.e., between the hat-shaped member and closing plate.

Embodiments

Figure 1B:
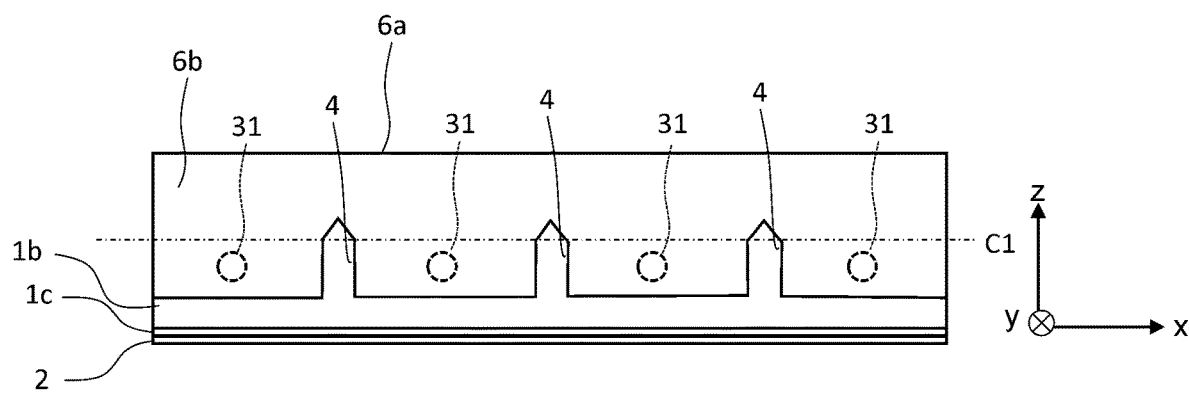
FIG. 1B is a side view of the structural member shown in FIG. 1A, as viewed in the y-direction.
Figure 1C:
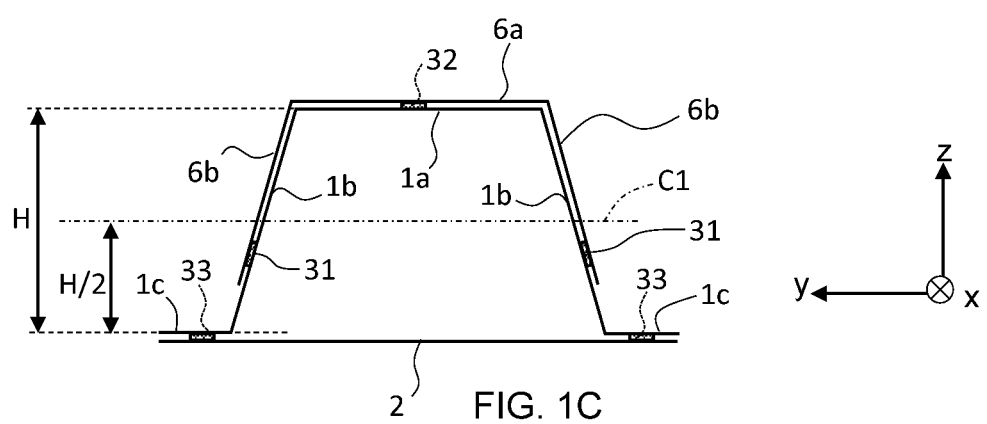
FIG. 1C is a front view of the structural member shown in FIG. 1A, as viewed in the x-direction.

FIG. 1A is a perspective view of a structural member 10 according to an embodiment. FIG. 1B is a side view of the structural member 10 shown in FIG. 1A as viewed in the direction perpendicular to the longitudinal direction and height direction (i.e., y-direction). FIG. 1C is a front view of the structural member 10 shown in FIG. 1A, as viewed in the longitudinal direction.

The structural member 10 includes a hat-shaped member 1, a closing plate 2, and a reinforcement member 6. The hat-shaped member 1 has a hat-shaped cross section. Portions of the hat-shaped member 1 and portions of the closing plate 2 are overlaid on each other and joined together. The hat-shaped member 1 and closing plate 2 are joined to form a closed cross-sectional construction. Portions of the reinforcement member 6 and portions of the hat-shaped member 1 are joined together.

As shown in FIG. 1A, the hat-shaped member 1 includes a first top plate 1a, two first walls 1b, and two flanges 1c. The two first walls 1b extend from the respective edges of the first top plate 1a and face each other. Each first wall 1b has one edge adjacent to the first top plate 1a and another edge opposite thereto, and the two flanges 1c extend away from each other, each from the other edge of the associated one of the two first walls 1b. That is, the two flanges 1c extend outwardly as determined along the direction in which the two facing first walls 1b are arranged, each from the other edge of the associated one of the two first walls 1b. The two flanges 1c are overlaid on the closing plate 2, and they are joined together. The closing plate 2 and two flanges 1c are joined by a plurality of welds 33. By way of example, the welds 33 are those from spot welding.

The borders between the first top plate 1a and the two first walls 1b (i.e., shoulders) form bent portions of the hat-shaped member 1. These bent portions form ridges extending in the longitudinal direction of the structural member 10 (i.e., x-direction). The borders between the two first walls 1b and the respective flanges 1c form bent portions of the hat-shaped member 1. These bent portions also form ridges extending in the x-direction.

The reinforcement member 6 is a grooved member including a second top plate 6a and two second walls 6b. The two second walls 6b extend from the respective edges of the second top plate 6a. That is, the second top plate 6a is located between the two second walls 6b. The two second walls 6b face each other. The second top plate 6a is overlaid on the first top plate 1a of the hat-shaped member 1. The second top plate 6a is joined to the first top plate 1a by welds 32. The second walls 6b are overlaid on the respective first walls 1b. Each second wall 6b is joined to the associated first wall 1b of the hat-shaped member 1 by a plurality of welds 31. By way of example, the welds 31 and 32 are those from spot welding. The second walls 6b of the reinforcement member have a higher tensile strength than the first walls 1b of the hat-shaped member 1.

As shown in FIGS. 1B and 1C, the plurality of welds 31 joining the first and second walls 1b and 6b are located closer to the closing plate 2 than the middle surface C1 between the first top plate 1a and closing plate 2 is. The distance between the middle surface C1 and first top plate 1a is equal to the distance between the middle surface C1 and closing plate 2. In the present embodiment, the middle surface C1 generally matches the neutral axis found when a load is applied to the first top plate 1a in the direction perpendicular thereto. The neutral axis is where, upon generation of bending moments in the member, the tension forces and compression forces in the longitudinal direction of the member are balanced so there is zero stress. Upon generation of bending moments in a member, there is zero stress at the neutral axis, whereas tension forces become larger as it goes away from the neutral axis toward the tension side and compression forces become larger as it goes away from the neutral axis toward the compression side. If the welds 31 are located closer to the closing plate 2 than the middle surface C1 is, application of an impact to the first top plate 1a causes tension forces between the welds 31. In the implementation shown in FIG. 1C, the middle surface C1 is located at a height of one-half of the height H of the first walls 1b (i.e., H/2) as measured in the direction perpendicular to the first top plate 1a (or surfaces of the flanges 1c).

Further, since the welds 31 are located closer to the closing plate 2 than the middle surface C1 is, deformation of the structural member 10 under a load in the direction perpendicular to the first top plate 1a can easily promote plastic deformation of the walls 1b, while the hat-shaped member 1 and reinforcement member 6 are resisting to the load. Further, since the tensile strength of the second walls 6b is higher than the tensile strength of the first walls 1b, the walls 1b deform while resisting to a certain load. Thus, the structural member 10 can efficiently absorb energy during deformation due to a load. Further, in the implementation shown in FIGS. 1A to 1C, the reinforcement member 6 supports a half of the height of the walls 1b or more. Thus, the structural member 10 will more efficiently absorb energy during deformation.

In the implementation shown in FIGS. 1A to 1C, the second top plate 6a of the reinforcement member 6 is located closer to the first top plate 1a than the middle surface C1 is. That is, the reinforcement member 6 is provided to straddle the region around the neutral axis. This further increases the effect of the reinforcement member 6 of reinforcing the first walls 1b. Further, during deformation of the structural member 10, the ridges between the second top plate 6a and second walls 6b of the reinforcement member 6 deform while resisting to the compression forces. This increases the energy absorption efficiency of the structural member 10 during deformation.

According to the present embodiment, the tensile strength of the first walls 1b of the hat-shaped member 1 may be not higher than 980 MPa, for example. That of the reinforcement member 6 may be not lower than 1100 MPa, for example. For example, the reinforcement member 6 may be formed from steel sheet containing martensite. The reinforcement member 6 may be made from a hot-stamped material or a super-high-tension material. The higher the strength of a member, the more easily the portions around the welds 31, 32 and 33 can be softened by heat from welding to form HAZ-softened portions. A hat-shaped member 1 with a tensile strength lower than 1100 MPa is less likely to experience a fracture from initiation points represented by HAZ-softened portions. A hat-shaped member 1 with a tensile strength not higher than 980 MPa is even less likely to experience a fracture from initiation points represented by HAZ-softened portions. In contrast, a reinforcement member 6 with a tensile strength not lower than 1100 MPa is likely to experience a fracture from initiation points represented by HAZ-softened portions. Particularly, when tension forces are generated between the welds 31 of the second walls 6b of the reinforcement member 6, a fracture from initiation points represented by HAZ-softened portions around welds 31 is likely to occur.

The strengths of the hat-shaped member 1 (at the first walls 1b) and reinforcement member 6 (at the second walls 6b) are not limited to the above exemplary ranges. For example, the tensile strength of the hat-shaped member 1 (at the first walls 1b) may be lower than 1100 MPa and the tensile strength of the reinforcement member 6 (at the second walls 6b) may be not lower than 1100 MPa. This increases the strength of the reinforcement member 6 to increase deformation resistance and, at the same time, prevent generation of HAZ-softened portions in the hat-shaped member 1 to reduce the risk of a fracture from initiation points represented by HAZ-softened portions. Further, to further increase deformation resistance, the tensile strength of the reinforcement member 6 (at the second walls 6b) may be not lower than 1180 MPa, and the tensile strength of the hat-shaped member 1 (at the first walls 1b) may be lower than 1180 MPa. Such implementations, too, will provide the effects of improving energy absorption efficiency and mitigating tension forces between the welds during deformation.

Edge segments 4 of the reinforcement member 6 are provided between the welds 31 joining the first and second walls 1b and 6b. The edge segments 4 of the reinforcement member 4 constitute parts of those edges the second walls 6b which are opposite to the edges adjacent to the second top plate 6b. That is, the edge segments 4 of the reinforcement member constitute parts of those edges of the second walls 6b which are adjacent to the closing plate 2. In the implementation shown in FIGS. 1A and 1B, the edge segments 4 of the reinforcement member 6 are the edges of notches in the reinforcement member 6. In other words, a disconnection in the reinforcement member 6, i.e., edge segment 4 of the reinforcement member 6, is positioned between a pair of adjacent ones of the welds 31. The portion of the reinforcement member 6 between a pair of adjacent welds 31 is divided by an edge segment 4.

The tension forces between the welds 31 generated by bending deformation of the structural member 10 under an impact on the first top plate 1a are mitigated by the edge segments 4 of the reinforcement member 6 between the welds 31. That is, the edge segments 4 of the reinforcement member 6 between the welds 31 prevent tension forces acting on the second walls 6b of the reinforcement member 6 from being transmitted between adjacent welds 31. For example, when the structural member 10 receives an external force in the direction perpendicular to the first top plate 1a and bends, tension forces act between two adjacent welds 31 that stretch the reinforcement member 6 in the longitudinal direction. In this case, since edge segments 4 of the reinforcement member 6 are present between one weld 31 and its adjacent welds 31, forces acting on this one weld 31 are not easily transmitted to the adjacent welds 31. Thus, the reinforcement member 6 can deform with no interference between two adjacent welds 31. This reduces strain concentration in the HAZ-softened portions around the welds 31. As a result, a fracture from initiation points represented by HAZ-softened portions around welds 31 is less likely.

To mitigate tension forces between welds, one might, for example, provide sags in portions of the first and second walls 1b and 6b located between the welds 31 such that, when tension forces are generated, the portions of the first and second walls 1b and 6b located between the welds 71 can be extended in the direction of tension. However, with such an arrangement, after the walls are completely extended so that no sags remain, tension forces are applied to the welds 31 and strain is concentrated. In this case, the fracture-prevention effect of the welds 31 cannot be obtained. In contrast, the present embodiment provides edge segments of the reinforcement member 6 located between the welds 31, thereby preventing a fracture of the welds more reliably.

In the implementation shown in FIGS. 1A and 1B, each first wall 1b of the hat-shaped member 1 is shaped such that the edge of the first wall 1b is not located between any pair of adjacent welds 31. That is, the portion of the first wall 1b located between a pair of adjacent welds 31 has no disconnection such as hole, notch or cut, for example. In such implementations, the entire region of the first wall 1b between any pair of adjacent welds 31 is continuous in shape. Further, the edge segment 4 of the reinforcement member 6 located between any pair of adjacent welds 31 overlies the first wall 1b.

Thus, in the regions between the welds 31, the first wall 1b of the hat-shaped member 1, which has a lower strength than the reinforcement member, is continuous, while the reinforcement member 6, with a higher strength, is discontinuous. In this arrangement, upon generation of tension forces between welds 31 during deformation of the structural member, the first walls 1b, which have a lower strength than the second walls 6b of the reinforcement member 6, is capable of providing a strength for resisting the deformation. This makes it possible to provide the appropriate resistance against deformation under tension and, at the same time, prevent application of excessive tension forces between welds. On the contrary, in an arrangement with sags in the first and second walls 1b and 6b between the welds 31 to allow the walls to be extended in the direction of tension, for example, almost no tension resistance is provided as long as the sags allow the walls to be extended in the direction of tension. Thus, the arrangement of the present embodiment with edge segments of the reinforcement member located between the welds, when observed as an entire structural member, has a higher deformation resistance than an arrangement with sags between the welds.

Each of the second walls 6b, toward the closing plate 2 relative to the middle surface C1, has edge segments located between the welds 31 and thus has disconnections along the longitudinal direction (i.e., direction of the ridges). On the other hand, toward the first top plate 1a relative to the middle surface C1, the second wall 6b is continuous along the longitudinal direction (i.e., direction of the ridges), that is, it includes integrally connected portions. That is, toward the first top plate 1a relative to the middle surface C1, there is a region in which the second wall 6b overlies the first wall 1b along its entire dimension in the longitudinal direction (i.e., direction of the ridges). According to the present embodiment, in one exemplary implementation, the middle surface C1 matches the neutral axis. During deformation of the structural member 10 under a load perpendicular to the first top plate 1a, compression forces are generated in regions closer to the first top plate 1a than the middle surface C1 is. Tension forces are generated in regions closer to the closing plate 2 than the middle surface C1 is. According to the present embodiment, the portions of the reinforcement member 6 in regions where compression forces are generated during deformation exhibit continuity, while the portions of the reinforcement member 6 in regions where tension forces are generated are joined to the hat-shaped member 1 and locally exhibit discontinuity. Thus, the structural member 10 can efficiently absorb energy while deforming under a load.

The edge segments of each second wall 6b, i.e., edge segments of the reinforcement member 6, do not reach the flange 1c. Thus, toward the closing plate 2 relative to the middle surface C1, there is a region in which the second wall 6b does not overlie the first wall 1b along its entire dimension in the longitudinal direction (i.e., direction of the ridges). Thus, the amount of material of the reinforcement member 6 in the regions experiencing high tension forces during deformation of the first wall 1b is smaller than the amount of material of the reinforcement member 6 in the regions experiencing high compression forces. Thus, the structural member 10 can efficiently absorb energy while deforming under a load. Further, the amount of material of the reinforcement member 6 is smaller than in implementations where the reinforcement member 6 covers the entire first walls 1b. Energy absorption during deformation can be improved by a reinforcement member 6 with less material.

In the implementation shown in FIGS. 1A and 1B, the reinforcement member 6 extends the entire dimension of the hat-shaped member 1 in the longitudinal direction; alternatively, the reinforcement member 6 may extend part of the dimension of the hat-shaped member 1 in the longitudinal direction. For example, the reinforcement member 6 may be provided only in portions of the hat-shaped member 1, as determined along the longitudinal direction, that are to be reinforced.

In the implementation shown in FIG. 1B, each edge segment 4 of the reinforcement member 6 extends across the region between a pair of adjacent welds 31 all the way to a position closer to the first top plate 1a than the middle surface C1 is. That is, each edge segment 4 of the reinforcement member 6 is constructed to extend from a region closer to the closing plate 2 than the middle surface C1 is all the way to a region closer to the first top plate 1a than the middle surface C1 is. The region near the middle surface C1 of the hat-shaped member 1 is close to the neutral axis, and thus this region experiences only small tension forces during deformation; tension forces increase as it goes away from the middle surface C1 toward the closing plate 2. If each edge segment 4 extends to a position closer to the first top plate 1a than the middle surface C1 is, the edge segments 4 can be positioned to cover the entire region where tension forces can be generated during deformation. This will further increase the fracture-prevention effect of the welds during tension stress concentration.

In the implementation shown in FIG. 1B, each edge segment 4 of the reinforcement member 6 between a pair of adjacent welds 31 extends from a region closer to the closing plate 2 than the middle surface C1 is, enters a region closer to the first top plate 1a than the middle surface C1 is, and then returns to a region closer to the closing plate 2 than the middle surface C1 is. Thus, the distal end of the notch formed by an edge segment 4 (i.e., recess that is recessed toward the first top plate 1a), which is located closest to the first top plate 1a, is located in a region closer to the first top plate 1a than the middle surface C1 is. During bending deformation, only small tension forces, or rather compression forces, are generated at positions closer to the first top plate 1a than the middle surface C1 is. Thus, the distal end of a notch is less likely to form an initiation point of fracture. Thus, each edge segment 4 of the reinforcement member 6 is positioned to straddle the middle surface C1 and the portion of the edge segment 4 located closest to the first top plate 1a is positioned in a region closer to the first top plate 1a than the middle surface C1 is. Thus, the distal end of the edge segment 4 is less likely to form an initiation point of fracture. As a result, the reinforcement member 6 is less likely to be fractured.

In the implementation shown in FIG. 1B, each edge segment 4 of the reinforcement member 6 between a pair of adjacent welds 31 does not reach the second top plate 6a. That is, each edge segment 4 of the reinforcement member 6 does not reach the ridge between the second top plate 6a and second wall 6b. The distal end of each edge 4 of the reinforcement member 6, which is located closest to the first top plate 1a, is located between the middle surface C1 and ridge. As the ridges between the second top plate 6a and second walls 6b resist compression forces, the reinforcement member 6 contributes to improvements in strength against an impact on the entire structural member 10. Thus, as each edge segment 4 is configured not to reach the ridge, the reinforcement effect of the ridge is reliably produced. As the portion of the edge 4 closest to the first top plate 1a is located between the middle surface C1 and second top plate 6a, the reinforcement member's effect of mitigating tension forces is increased while reliably producing its reinforcement effect.

The present embodiment provides an implementation where the neutral axis generally matches the middle surface C1. The neutral axis need not exactly match the middle surface C1. Even if the neutral axis is somewhat misaligned from the middle surface C1, the effect of the edge segments of the reinforcement member 4 positioned with respect to the middle surface C1 is obtained. This is because, even with a misalignment between the middle surface C1 and the neutral axis, tendencies during deformation of the structural member 10 under a load perpendicular to the first top plate 1a remain the same: namely, in the first and second walls 1b and 6b, compression forces increase as it goes away from the middle surface C1 toward the first top plate 1a and tension forces increase as it goes away from the middle surface C1 toward the closing plate 2. Further, in the first and second walls 1b and 6b, regions close to the middle surface C1, which are close to the neutral axis, only experience small compression forces and small tension forces. Even with some misalignment of the neutral axis from the middle surface C1, there is produced the effect of the edge segments 4 of the reinforcement member 6 between the adjacent welds 31 extending to positions closer to the first top plate 1a than the middle surface C1 is.

Exemplary Configurations of Edge Segments of Reinforcement Member

Figure 2:
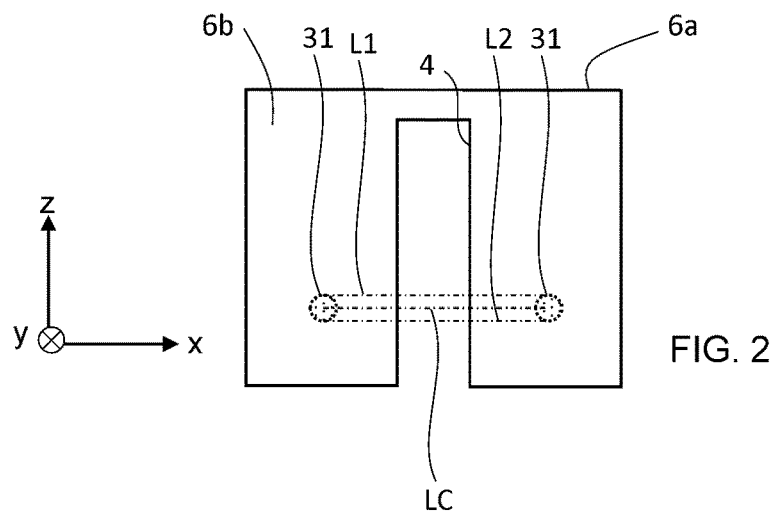
FIG. 2 shows an exemplary configuration of the disconnections.
Figure 3:
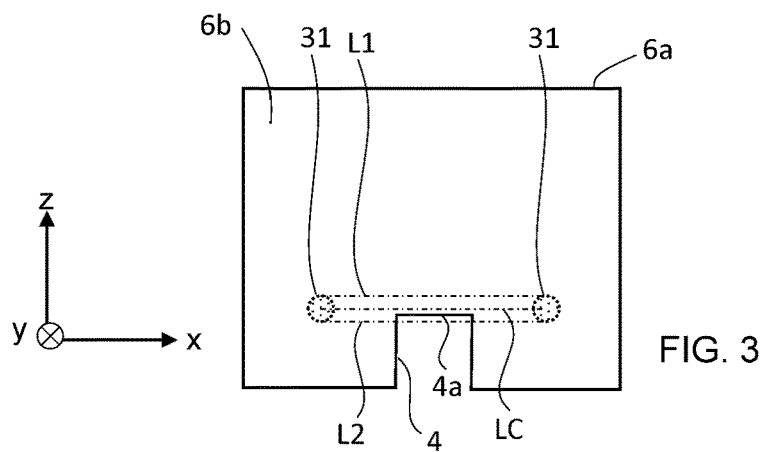
FIG. 3 shows an exemplary configuration of the disconnections.
Figure 4:
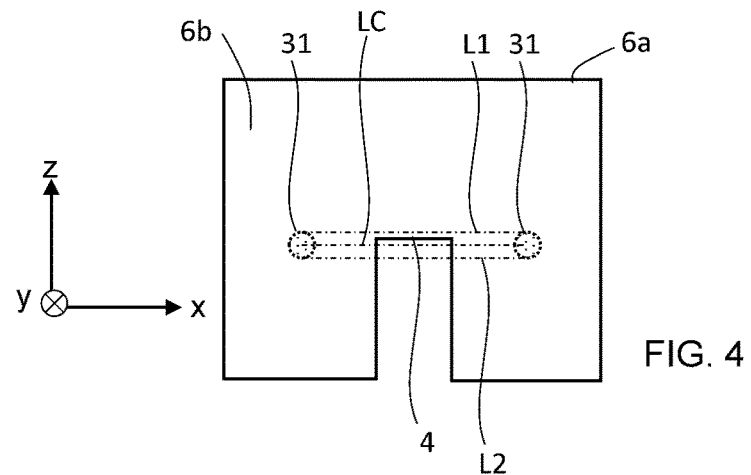
FIG. 4 shows an exemplary configuration of the disconnections.

FIGS. 2 to 4 show exemplary configurations of the edge segments 4 of the reinforcement member 6 between the welds. In the implementation shown in FIG. 2, an edge segment 4 is shaped to extend across the region sandwiched by a pair of adjacent welds 31 (i.e., region between a pair of adjacent welds 31) as viewed in the y-direction (i.e., direction generally perpendicular to the first walls). This will further increase the effect of an edge segment 4 of preventing a fracture originating from initiation points represented by HAZ-softened portions around welds 31. In FIG. 2, the region sandwiched by a pair of adjacent welds 31 is the region defined by the line L1 connecting one of the ends of one weld 31 as determined along the z-direction with the corresponding end of the adjacent weld 31, on one hand, and the line L2 connecting the other one of the ends of the one weld 31 as determined along the z-direction with the corresponding end of the adjacent weld 31, on the other.

In the implementation shown in FIG. 3, the upper end of an edge segment 4 (i.e., portion of the wedge segment closest to the second top plate 6a) 4a, is located in the region sandwiched by a pair of adjacent welds 31. Thus, an edge segment 4 of the reinforcement member 6 may be present in part of the region sandwiched by a pair of adjacent welds 31, where the edge segment 4 of the reinforcement member 6 does not extend across the region. Such an implementation also provides the effect of an edge segment 4 of the reinforcement member 6 of preventing a fracture originating from initiation points represented by HAZ-softened portions around welds 31.

In the implementation shown in FIG. 4, an edge segment 4 of the reinforcement member 6 is positioned so as to cross the line LC that connects the centers of a pair of adjacent welds 31. This will further increase the effect of an edge segment 4 of the reinforcement member 6 of preventing a fracture originating from initiation points represented by HAZ-softened portions around welds 31.

Figure 5:
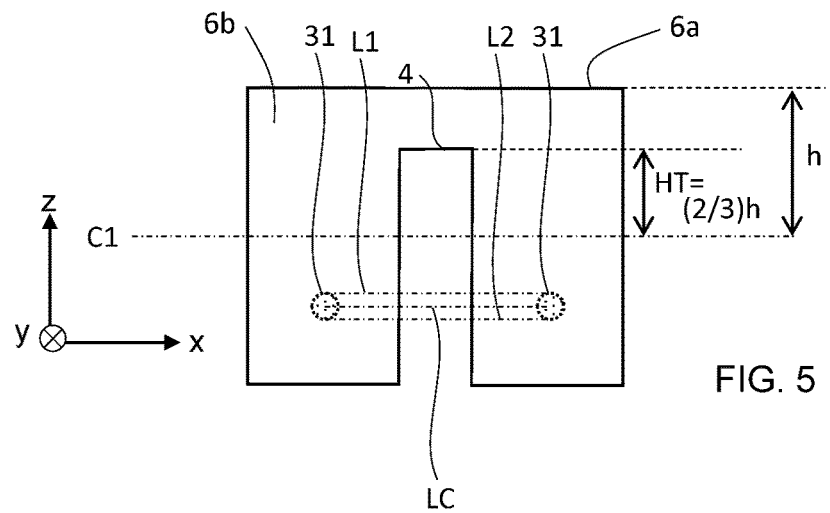
FIG. 5 shows a variation of the disconnection configuration.

FIG. 5 shows another exemplary configuration of the edge segments 4 of the reinforcement member 6. In the implementation shown in FIG. 5, the position on an edge segment 4 so closest to the second top plate 6a is located in the region defined by the middle surface C1 and second top plate 6a. In the implementation shown in FIG. 5, the distance between the position on an edge segment 4 of the reinforcement member closest to the second top plate 6a and the middle surface C2, HT, is $(2/3)h$. Here, h is the distance h between the second top plate 6a and middle surface C1. Thus, the edge segments 4 of the reinforcement member 6 are spaced apart from the second top plate 6a by a certain distance. Ensuring that $HT \leq (2/3)h$ reliably produces the reinforcement effect of the ridges between the second top plate 6a and second walls 6b of the reinforcement member 6. In view of this, preferably $HT \leq (1/2)h$, and more preferably $HT \leq (1/4)h$.

Figure 6:
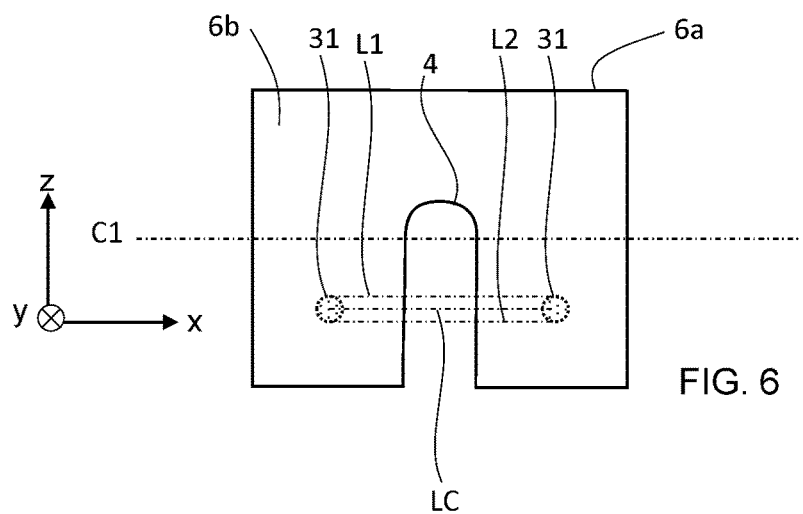
FIG. 6 shows a variation of the disconnection configuration.
Figure 7:
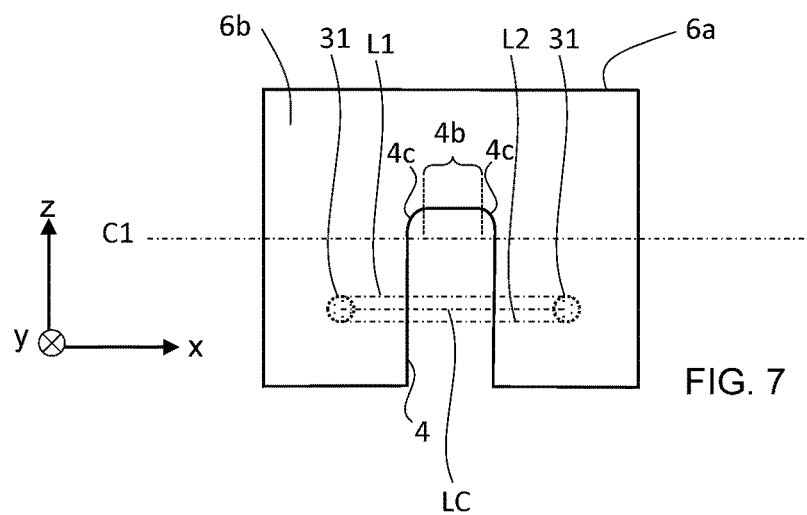
FIG. 7 shows a variation of the disconnection configuration.

In each of the implementations shown in FIGS. 2 to 5, the edge segment 4 is constituted by the edges of a notch. In such implementations, the notch is not limited to shapes with two right angles, such as those shown in FIGS. 2 to 5. For example, as shown in FIGS. 6 and 7, the shape created by the edges of the notch may have no corners, or may have round-shaped corners. Thus, the edge segment 4 is less likely to form an initiation point of fracture.

In the implementation shown in FIG. 6, the edge segment 4, i.e., edges of a notch, includes a curve recessed toward the second top plate 6a. Specifically, the edge of the notch at the distal end is arc-shaped, recessed toward the second top plate 6a.

In the implementation shown in FIG. 7, the edge of the notch at the distal end is constituted by a straight portion 4b and round-shaped portions on its both ends, and is shaped to be recessed toward the second top plate 6a.

Figure 8:
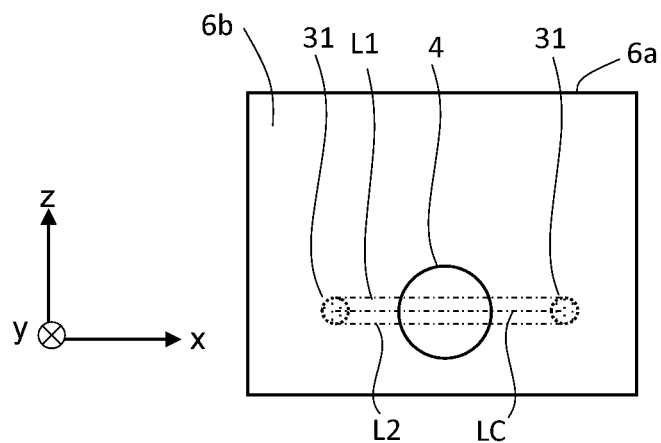
FIG. 8 shows a variation of the disconnection configuration.
Figure 9:
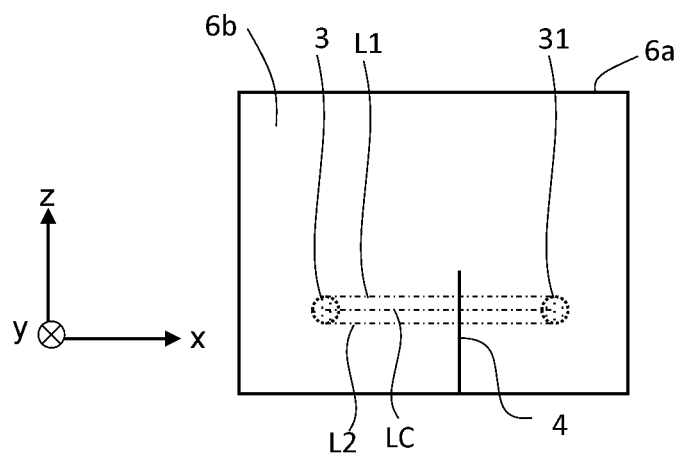
FIG. 9 shows a variation of the disconnection configuration.

FIGS. 8 and 9 show variations of the edge segments 4 of the reinforcement member 6 between the welds 31. In each of the implementations shown in FIGS. 2 to 7, the edges of a notch (i.e., slit) in the second wall 6b of the reinforcement member 6 constitute the edge segment 4. In contrast, in the implementation shown in FIG. 8, the edge of a hole (i.e., through-hole) in the second wall 6b of the reinforcement member 6 constitutes the edge segment 4. In the implementation shown in FIG. 9, a cut in the reinforcement member 6 constitutes the edge segment 4. At the cut, two opposite surfaces, extending deep into the second wall of the reinforcement member 6, are in slidable contact with each other.

The edge segment 4 constituted by the edge(s) of a through-hole or cut shown in FIG. 8 or 9 may be present in part of the region sandwiched by a pair of adjacent welds 31, similar to that in FIG. 3. Further, the edge segment 4 constituted by the edge(s) of a through-hole or cut may be located on the line LC connecting the centers of a pair of adjacent welds 31, similar to that in FIG. 4.

Figure 10:
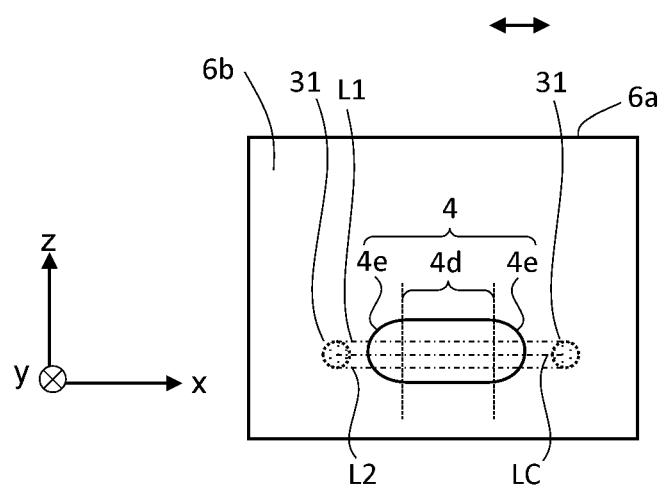
FIG. 10 shows a variation of the disconnection configuration.

Although the through-hole shown in FIG. 8 is circular in shape, the through-hole is not limited to such a shape. For example, the dimension of the through-hole in the longitudinal direction (i.e., direction of the ridges) may be larger than the dimension in the direction perpendicular thereto. For example, as shown in FIG. 10, the edge of the through-hole 4 may be constituted by two straight lines 4d extending in the longitudinal direction and curved lines 4e each connecting the associated ends of the two straight lines and protruding outwardly.

In each of the implementations shown in FIGS. 2 to 5, the edge segment 4 of the reinforcement member 6 between a pair of welds 31 on a second wall 6b does not reach the ridge between the second wall 6b and second top plate 6a. That is, the edge segment 4 between a pair of welds 31 on a second wall 6b is positioned so as not to reach the second top plate 6a. This prevents the edge segment 4 from decreasing the bending rigidity of the reinforcement member 6. In each of the implementations shown in FIGS. 2, 3, 4 and 6, the edge segment 4 of the reinforcement member 6 between a pair of welds 31 on a second wall 6b is a continuation from the edge of the wall opposite to the edge adjacent to the second top plate 6a.

In the structural member 10 according to the present embodiment, application of an impact to the first top plate 1a perpendicular thereto generates tension forces between welds 31 joining the first walls 1b of the hat-shaped member 1 and the second walls 6b of the reinforcement member 6. Positioning the edge segments 4 of the reinforcement member 6 between the welds 31 on the second walls 6b of the reinforcement member 6 allows tension forces to be dispersed. This results in a reduction in strain concentration in the HAZ-softened portions around the welds 31. This prevents a fracture originating from initiation points represented by HAZ-softened portions.

Variation of Hat-Shaped Member, Closing Plate and Reinforcement Member

Figure 11:
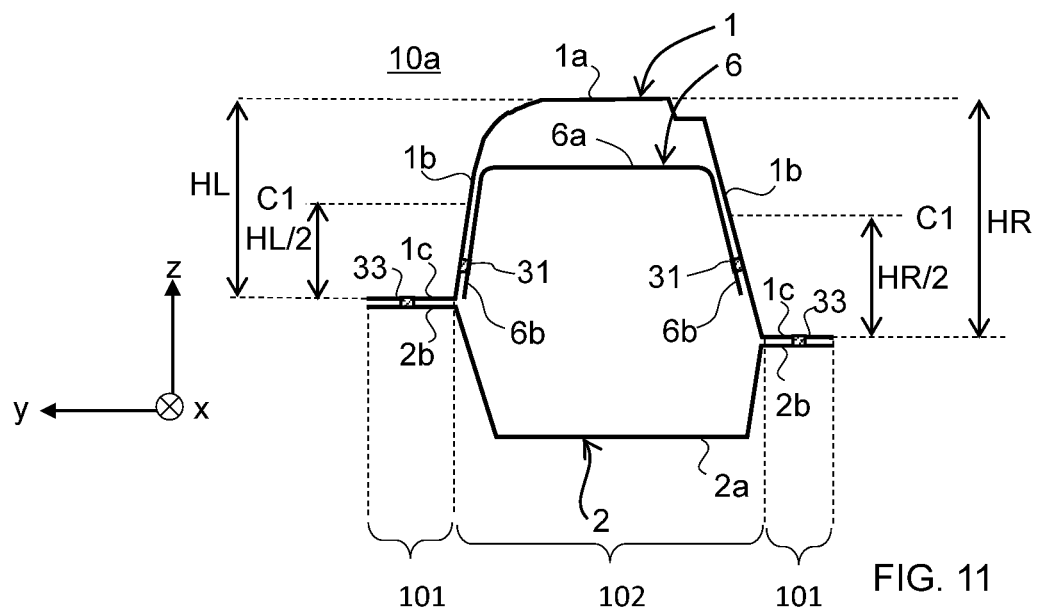
FIG. 11 is a cross-sectional view of a variation of the cross-sectional shape of the structural member.

FIG. 11 is a cross-sectional view of a variation of the cross-sectional shape of the structural member. The structural member 10a shown in FIG. 1C has a symmetrical cross-sectional shape with respect to the perpendicular bisector (i.e., plane containing the x-axis) of the closing plate 2. In contrast, the structural member 10a shown in FIG. 11 is not symmetrical with respect to the perpendicular bisector of the closing plate 2. The hat-shaped member 1 of the structural member 10a shown in FIG. 11 has two first walls 1b with different shapes. The two first walls 1b have different angles relative to the flanges 1c and different heights in the z-direction, HR and HL.

In the implementation shown in FIG. 11, one of the two first walls 1b has a step. The other one of the two first walls 1b is curved in shape such that its outer surface is a curved surface. Specifically, the outer surface of a portion of the other first wall 1b extending from the first top plate 1a is a curved surface.

Although not shown, at least one of the first top plate 1a, first walls 1b, flanges 1c and closing plate 2 may have a curved surface, instead of a flat surface. That is, at least one of the first top plate 1a, first walls 1b, flanges 1c and closing plate 2 may have a portion with a curved surface. Further, at least one of the first top plate 6a and second walls 6b of the reinforcement member 6 may have a curved surface, instead of a flat surface. For example, at least a portion of the second top plate 6a and second walls 6b may have a curved surface.

In the implementation shown in FIG. 11, the closing plate 2 is shaped to protrude away from the hat-shaped member 1. Specifically, the closing plate 2 includes two portions 2b overlying the flanges 1c of the hat-shaped member 1 and a portion 2a located between these two portions 2b. The portion 2a is shaped to protrude away from the hat-shaped member 1. In this implementation, the closing plate 2 has a hat-shaped cross section. This provides a so-called double hat-shaped structural member. In other implementations of the arrangement shown in FIG. 11, the portion 2a between the portions 2a overlying the flanges 1c of the closing plate 2 may not protrude, but may be constituted by a flat sheet.

The reinforcement member 6 is positioned between the hat-shaped member 1 and closing plate 2. In the implementation shown in FIG. 1, the reinforcement member 6 is located outside the closed cross-sectional construction formed by the hat-shaped member 1 and closing plate 2. In contrast, in the implementation shown in FIG. 11, the reinforcement member 6 is located inside the closed cross-sectional construction. The outer surfaces of the second walls 6b of the reinforcement member 6 are in contact with the inner surfaces of the first walls 1b of the hat-shaped member 1 and, in this state, joined thereto by the welds 31. For each of the two first walls 1b, the welds 31 are located closer to the closing plate 2 than the middle surface C1 between the first top plate 1a and closing plate 2 is.

In the implementation shown in FIG. 11, the second top plate 6a of the reinforcement member 6 is located closer to the first top plate 1a than the middle surface C1 is. In this implementation, each of the second walls 6b of the reinforcement member 6b extends from the second top plate 6b to a position closer to the closing plate 2 than the middle surface C1 is. In other implementations, the second top plate 6a may be located closer to the closing plate 2 than the middle surface C1 is. In the implementation shown in FIG. 11, the edges of the reinforcement member 6, that is, the portions of the edges of the second walls 6b opposite to the edges adjacent to the second top plate 6b which are closest to the closing plate 2, are located between the middle surface C1 and closing plate 2.

For one first wall 1b, the plane(surface) at the height of one-half of the height HL of the one first wall 1b, defined as the distance between the closing plate 2 and first top plate 1a, (HL/2), constitutes the middle surface C1. For the other first wall 1b, the plane(surface) at the height of one-half of the height HR of the other first wall 1b, defined as the distance between the closing plate 2 and first top plate 1a, (HR/2), constitutes the middle surface C1.

The structural member according to the present embodiment is a vehicle skeleton member. The structural member according to the present embodiment can be suitably used as a bendable/crushable member that is expected to be deformed or destroyed by bending. In such implementations, the structural member may be an arrangement with a closed cross-sectional construction with a reinforcement member added to improve the resistance of the side that can be compressed. The structural members 10 and 10a in the above-illustrated implementations can be used as vehicle skeleton members that are expected to be bent under impact on the first top plate 1a. This will prevent a fracture originating from initiation points represented by welds. This will provide a vehicle skeleton member that cannot easily be destroyed.

Examples of vehicle skeleton members include frame parts for automobile structures such as front frames, rear frames, side sills, front pillars (A-pillars), center pillars (B-pillars), cross members, side rails, tunnels, bumper reinforcements, and various other reinforcements (or strengthening members). Such an automobile structure is, upon a crash of the automobile, deformed and destroyed, where the present invention exhibits its effectiveness.

For example, if the above-illustrated structural member 10 or 10a is used as a B-pillar, the hat-shaped member 1 provides an outer, the closing plate 2 an inner, and the reinforcement member 6 a reinforcement. In such implementations, the structural member 10 is attached to the vehicle such that the hat-shaped member 1 is located outward with respect to the vehicle and the closing plate 2 is located inward with respect to the vehicle. Thus, an impact from outside the vehicle is received by the first top plate 1a of the hat-shaped member 1. When this impact from outside the vehicle causes bending deformation of the structural member 10 or 10a, tension forces are generated between welds 31 on the first and second walls 1b and 6b. The edge segments 4 of the reinforcement member 6 located between the welds 31 prevent strain concentration in the vicinity of the welds 31. This prevents a fracture originating from initiation points represented by HAZ-softened portions near welds 31.

For example, the structural member 10 or 10a may be provided in a vehicle such that the direction in which the welds 31 of the structural member 10 or 10a are arranged, i.e., the longitudinal direction of the first walls 1b, conforms with the outer profile of the vehicle. That is, the structural member 10 may be provided in a vehicle such that the direction in which the welds 31 of the structural member 10 or 10a are arranged is generally perpendicular to an impact from outside the vehicle. This will allow the structural member 10 or 10a to efficiently absorb energy upon reception of an impact from outside the vehicle. Further, this will prevent a fracture originating from initiation points represented by HAZ-softened portions around welds 31. Thus, implementations where the above-illustrated structural member is a vehicle skeleton member, and vehicles including such vehicle skeleton members, are included in the embodiments of the present invention.

Although an embodiment of the present invention has been described, the above-described embodiment is provided merely by way of example to enable carrying out the present invention. Accordingly, the present invention is not limited to the above-described embodiment, and the above-described embodiment, when carried out, can be modified appropriately without departing from the spirit of the invention.

EXPLANATION OF CHARACTERS

1: hat-shaped member
2: closing plate
31, 32, 33: welds
4: edge segments
6: reinforcement member
10: structural member
1a: first top plate
1b: first walls
1c: flanges
6a: second top plate
6b: second walls

The invention claimed is:

1. A vehicle skeleton member comprising:
a hat-shaped member;
a closing plate;
a reinforcement member; and
a plurality of welds,
wherein the hat-shaped member includes a first top plate, two first walls, and two flanges, the first top plate is located between the two first walls,
each of the first walls is located between the top plate and the associated one of the flanges,
the flanges are joined to the closing plate,
the reinforcement member includes a second top plate and two second walls,
the second top plate is located between the two second walls,
each of the first walls and the associated one of the second walls are overlaid on each other,
the plurality of welds join the first walls and the second walls,
the plurality of welds joining the first and second walls are located at positions on the first walls closer to the closing plate than a middle surface between the first top plate and the closing plate is,
a tensile strength of the second walls is higher than a tensile strength of the first walls,
in each of the second walls, an edge opposite to an edge adjacent to the second top plate provides an edge segment of the reinforcement member,
an edge of a notch, an edge of a hole or a cut in the second wall constitutes the edge segment, and
the edge segment of the reinforcement member is located between the plurality of welds.

2. The vehicle skeleton member according to claim 1, wherein the edge segment of the reinforcement member extends across a region between adjacent ones of the welds.

3. The vehicle skeleton member according to claim 2, wherein the edge segment of the reinforcement member extends across the region between the adjacent ones of the welds and extends up to a position on the associated first wall closer to the first top plate than the middle surface between the first top plate and the closing plate is.

4. The vehicle skeleton member according to claim 1, wherein the first walls are formed such that edges of first walls are not present between adjacent ones of the welds, and the edge segment of the reinforcement member located between the adjacent ones of the welds overlies the associated first wall.

5. The vehicle skeleton member according to claim 1, wherein the edge segment of the reinforcement member extending between the plurality of welds do not reach a ridge between the second top plate and the associated second wall.

6. The vehicle skeleton member according to claim 1, wherein the tensile strength of the second walls is not lower than 1100 MPa.

7. The vehicle skeleton member according to claim 1, wherein the tensile strength of the first walls is not higher than 980 MPa.

8. A vehicle skeleton including the vehicle skeleton member according to claim 1, wherein the first top plate is located outward with respect to a vehicle, and the closing plate is located inward with respect to the vehicle.

\* \* \* \* \*